United States Patent [19]
Schuez et al.

[11] Patent Number: 5,775,411
[45] Date of Patent: Jul. 7, 1998

[54] HEAT-EXCHANGER TUBE FOR CONDENSING OF VAPOR

[75] Inventors: Gerhard Schuez, Voehringen; Manfred Knab, Dornstadt-Bollingen; Robert Kloeckler, Tiefenbach, all of Germany

[73] Assignee: Wieland-Werke AG, Ulm, Germany

[21] Appl. No.: 744,267

[22] Filed: Nov. 6, 1996

Related U.S. Application Data

[63] Continuation of Ser. No. 384,000, Feb. 6, 1995, abandoned.

[30] Foreign Application Priority Data

Feb. 11, 1994 [DE] Germany ............ 44 04 357.0

[51] Int. Cl.[6] .................................................. F28F 1/34
[52] U.S. Cl. ............. 165/133; 165/184; 165/DIG. 515; 165/DIG. 525
[58] Field of Search ................................. 165/133, 179, 165/183, 184; 29/890.046, 890.048, 890.053

[56] References Cited

U.S. PATENT DOCUMENTS

| | | | |
|---|---|---|---|
| 1,865,575 | 7/1932 | Locke | 72/97 |
| 3,207,673 | 9/1965 | Bowden | 165/184 X |
| 3,327,512 | 6/1967 | Novak et al. | 72/367 |
| 4,085,491 | 4/1978 | Mathwig | 165/184 X |
| 4,166,498 | 9/1979 | Fujie et al. | 165/133 |
| 4,215,454 | 8/1980 | Anthony | 29/890.046 |
| 4,245,695 | 1/1981 | Fujikake | 165/133 |
| 4,538,677 | 9/1985 | Bodas et al. | 165/184 X |
| 4,577,381 | 3/1986 | Sato et al. | 165/133 X |
| 4,753,833 | 6/1988 | Fishgal et al. | 165/133 X |
| 5,333,682 | 8/1994 | Liu et al. | 165/133 |
| 5,377,746 | 1/1995 | Reid et al. | 165/184 |

FOREIGN PATENT DOCUMENTS

| | | | |
|---|---|---|---|
| 161391 | 11/1985 | European Pat. Off. | 165/133 |
| 0 206 640 | 12/1986 | European Pat. Off. | |
| 716972 | 12/1931 | France | 165/183 |
| 1 501 655 | 10/1969 | Germany | |
| 2 758 527 | 7/1979 | Germany | |
| 3 332 282 | 3/1984 | Germany | |
| 52-14260 | 2/1977 | Japan | 165/133 |
| 58-47994 | 3/1983 | Japan | 165/133 |
| 63-61895 | 3/1988 | Japan | 165/133 |
| 19866 | 9/1906 | United Kingdom | 165/184 |

*Primary Examiner*—Leonard R. Leo
*Attorney, Agent, or Firm*—Flynn, Thiel, Boutell & Tanis, P.C.

[57] ABSTRACT

The invention relates to a metallic heat-exchanger tube (1) with fins (2) which annularly or helically extend or rather extend in axial direction on the outside of the tube for condensing of vapor from pure substances or mixtures on the outside of the tube. To improve the condensation performance by effecting a thinning of a liquid film, the invention includes a making of the fins so that they have a constant fin height H throughout, with the fin flanks (4) being structured by spaced-apart depressions.

21 Claims, 6 Drawing Sheets

HEAT-EXCHANGER TUBE FOR CONDENSING OF VAPOR

This application is a continuation of U.S. Ser. No. 08/384,000, filed Feb. 6, 1995, abandoned.

FIELD OF THE INVENTION

The invention relates to a metallic heat-exchanger tube with annular or helical extending fins on the exterior thereof for condensing vapor from pure substances or mixtures.

BACKGROUND OF THE INVENTION

"Convex edges" are to be understood as being outwardly raised, (from the fin material) projecting edges. "Concave edges" are edges lying on the inside relative to the surface (compare FIGS. 1a and 1b). It is thereby not of any importance, in the sense of this definition, whether the edge is defined by straight or curved lines in cross section.

Condensation occurs in many areas of HVAC (heating, ventilating, air conditioning) technology as well as process and energy technology. Vapor from pure substances or mixtures is hereby completely or partially transferred into the liquid phase by removing condensation enthalpy from the vapor.

The cooling medium is often separated by a wall from the vapor. Condensers are in this art often designed as horizontal tube assembly heat exchangers, in which the vapor is condensed either on the outside or inside of the tube. Many evaporators are heated by condensation of a vapor. These can be arranged both horizontally and also vertically.

To improve the heat transfer, the partition wall can have both on the cooling medium side and also on the vapor side special structures (as a rule fins, wave-like grooves or pyramid-like elevations). These can extend both in the direction of the axis of the tube and also perpendicular to the axis or at any other angle thereto. These special structures are used to enlarge the surface on the side of the vapor. When using special structures, surface effects become additionally effective. Due to the change of the saturation vapor pressure over curved phase boundary surfaces (menisci), the condensate film is thinned in convex (outwardly curved) surface regions and thus the heat transfer is locally intensified. The condensation takes place essentially at the fin tips whereat the fins are the most convexly curved. In the case of horizontal tubes with transverse fins, for example, the created condensate is pulled to the fin base by surface forces, from whence it drops downwardly due to gravity.

To increase the convex edges, fin tubes with a special fin profile were developed (compare, for example, DE-Patent No. 2 731 476 corresponding to U.S. Pat. No. 4,166,498). The fin density was furthermore more and more increased. With the increasing condensate retention in the fin spaces due to the capillary effect and the related blocking of the surface through condensate, limits, however, were imposed to the intensification of the heat transfer through an increase of the fin density.

More convex edges were also produced by grooving of fins for example, DE-OS 1 501 656 and EP-OS 206 640 (corresponds to U.S. Pat. Nos. 4,660,630 and 4,729,155). This modification limits the intensification of the heat transfer through a certain fineness of the grooves; a further reduction in size of the grooves increases the condensate retention in the grooves.

Furthermore, pyramid-like elevations were applied to a finned surface (for example, U.S. Pat. No. 4,245,695). A thinning of the film occurs both at the fin tips and also the edges of the pyramids. However, the pyramids may not lie too closely side-by-side since otherwise the condensate is held back between them.

Other modifications are based on the creation of stacked fin tips, for example, Y-shaped fins according to DE-Patent 2,758,527 (corresponds to U.S. Pat. No. 4,179,911) or fins with three tips according to DE-Patent 3,332,282 (corresponds to U.S. Pat. No. 4,549,606). However, the effective distance between the fins is reduced with these technologies, which is unfavorable in view of the condensate retention through capillary forces.

The basic purpose of the invention is therefore to improve heat-exchanger tubes of the above-mentioned type in such a manner that convex edge lengths, which are as large as possible, are created for thinning of the film such that sufficiently large distances between the individual fins are to remain in order to reduce the condensate hold-back.

SUMMARY OF THE INVENTION

The purpose is attained according to the invention in transversely and longitudinally finned tubes in such a manner that the fins have a constant fin height H throughout, with the fin flanks having a trapezoidally-shaped cross section and being structured by spaced-apart depressions.

By forming depressions in the fin flanks, the convex edge length is significantly increased. A web remains in the fin center so that these depressions can be formed in both sides of the fins. By correctly choosing the geometric parameters, it is possible according to the invention to produce significantly more convex edges than in other convention methods (compare, for example, the above-mentioned DE-OS 1 501 656 and EP-OS 206 640). 4 to 30 depressions per cm of fin length are according to a preferred embodiment of the invention arranged both in transversely and also in longitudinally finned tubes.

The depressions start in a preferred embodiment of the invention from the fin tips and extend in direction of the fin base with a depth of 20% to 80% of the fin height H.

The depressions can be designed within wide limits:
The depressions can have a spherically round, semicircular, half-ovallike, rectangular, trapezoidal or triangular longitudinal cross section (viewed parallel with respect to the fin flank), with the cross section (viewed perpendicularly with respect to the fin flank) being able to be rectangular, triangular, rounded, trapezoidal or rhombic.

The influence of the depressions is further increased by having at least two rows of depressions extending at different heights on the fin flanks.

The type of structures on the fin flanks can be very different, thus the depressions in the two fin flanks of one fin are each arranged, according to the invention, in alignment with one another or offset relative to one another.

Different structures for the fin flanks can be produced through the combination of the above-disclosed parameters, in particular, when the depressions in the two fin flanks of one fin each have a different longitudinal or rather cross-sectional form and/or are arranged at a different pitch T.

It is particularly advisable to apply the depressions of the invention to fin tubes with 10 to 80 fins per inch, which have a fin height of H=0.5 to 1.7 mm.

Heat-exchanger tubes designed according to the invention are also suited as evaporator tubes (evaporation on the outside), when the fin tips are upset so that almost closed channels are created under the outer tube surface.

To intensify the heat transfer, it is possible to combine the inventively suggested, structured fin flanks with different structures on the inside of the tube. It is thereby preferably provided that the inside has helically extending inner fins. According to another alternative, the inside has corrugations which extend under the same or at another helix angle than the helix of the fin base of the outer fins. The corrugations arranged on the inside can, in a change of this modification, be interrupted. A further improvement is achieved by the inner fins or rather corrugations being themselves structured.

A further subject matter of the invention is a method for the manufacture of a heat-exchanger tube of the invention with integral fins helically extending on the outside of the tube.

The method of the invention is characterized in such a manner that after the forming of the fins, the depressions are pressed into the fin flanks by at least one structured rolling disk.

The wording "and/or" refers to whether the tube should or should not rotate simultaneously during the axial feed movement.

BRIEF DESCRIPTION OF THE DRAWINGS

The invention will be discussed in greater detail in connection with the following exemplary embodiments, in which.

DETAILED DESCRIPTION

Figure 1:
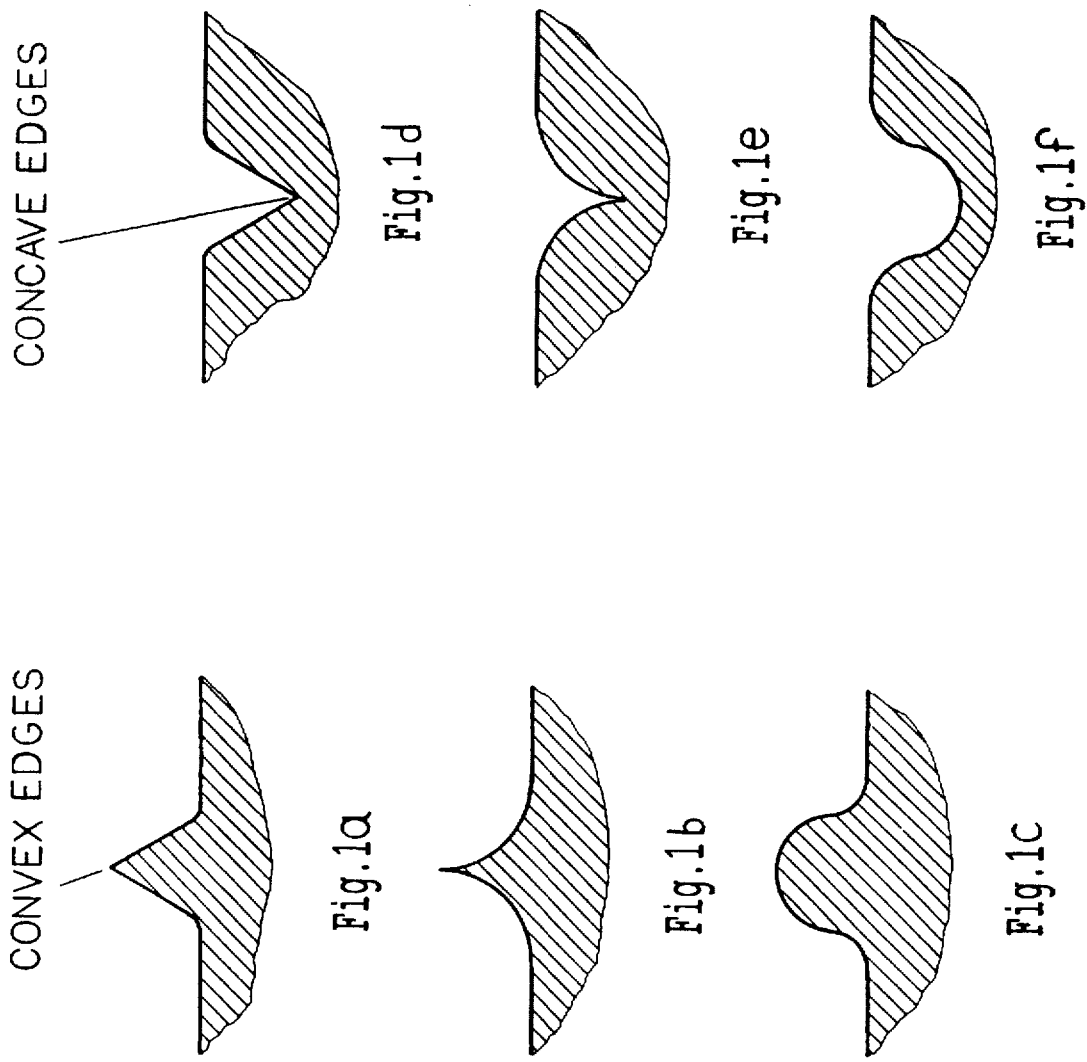
FIGS. 1a–1f illustrate concave edges and convex edges.
Figure 2:
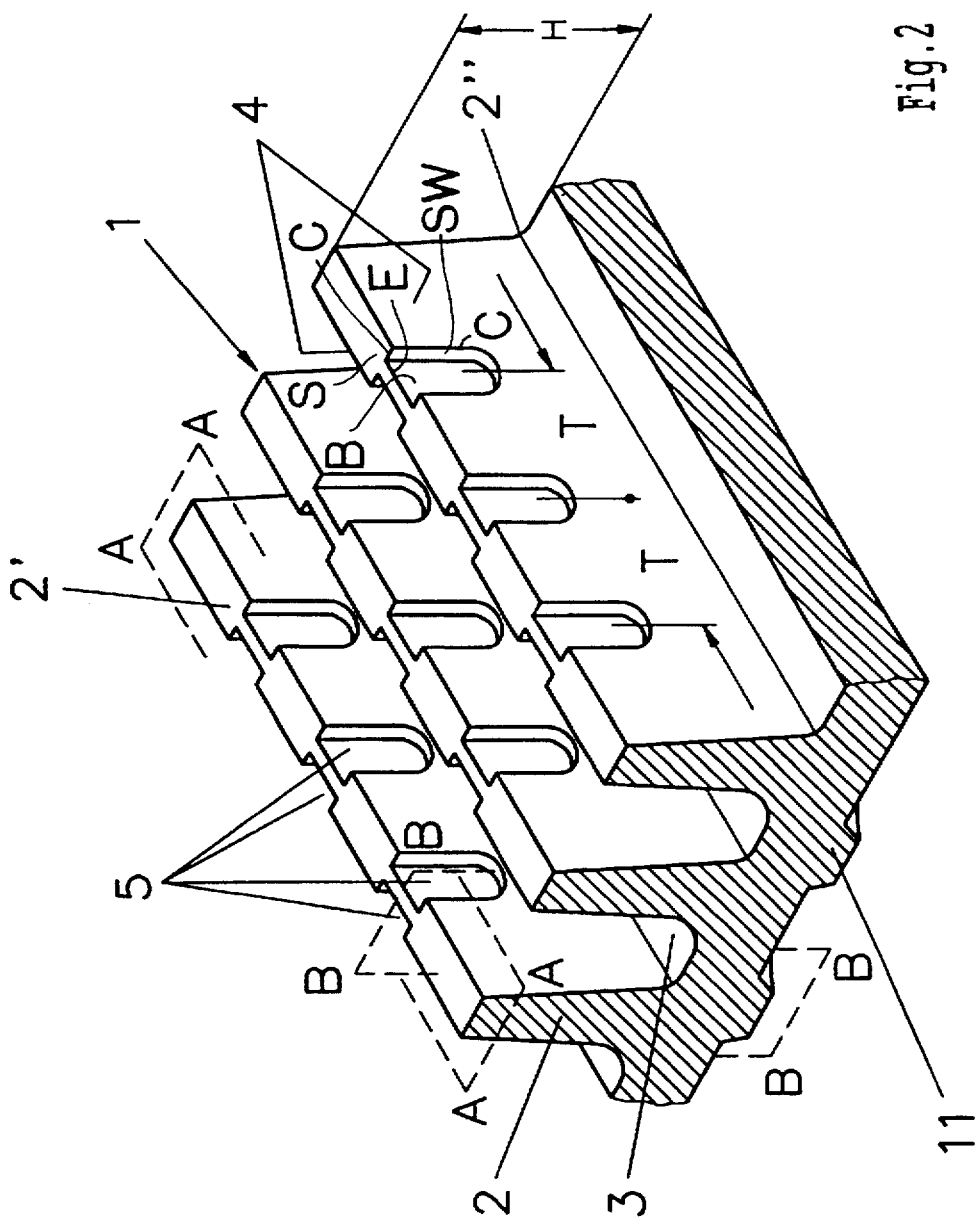
FIG. 2 illustrates schematically a section of a heat-exchanger tube embodying the invention.

FIG. 2 illustrates schematically an integral finned tube 1, which has fins 2 helically extending around its outside, between which fins a groove 3 is formed. The fins 2 have a trapezoidally-shaped cross section (see FIGS. 2 and 3) and a constant height H. Depressions 5 are pressed into the fin flanks 4, which depressions extend in the present case each from the tip 2' of the fin to the base 2' of the fin. The pitch of the depressions 5 (the distance from center to center) is identified by the letter T.

The finned tube 1 of the invention is manufactured by a rolling process (compare U.S. Pat. Nos. 1,865,575 and 3,327,512) by means of the device illustrated in FIG. 3.

Figure 3:
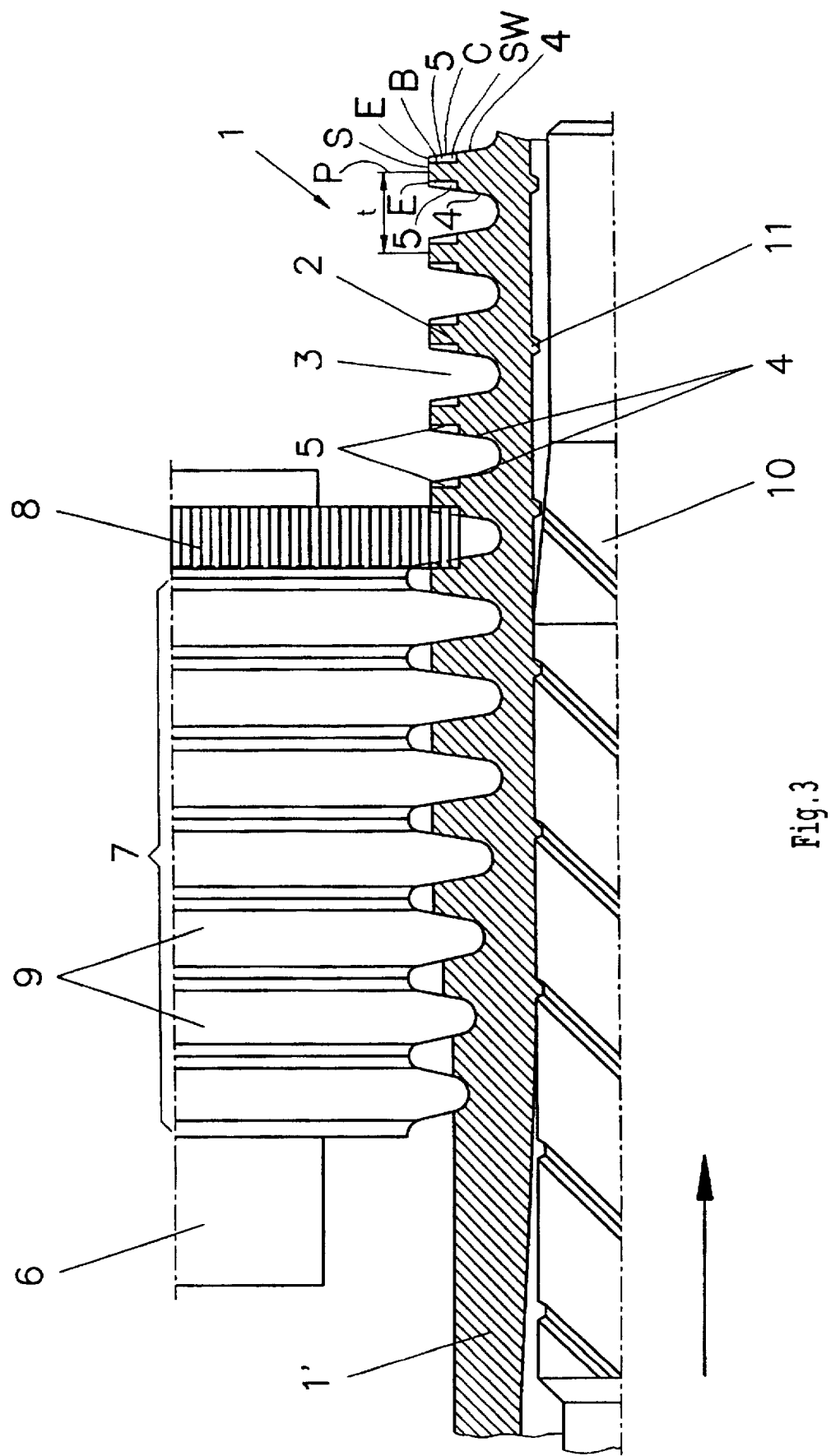
FIG. 3 illustrates a device for the manufacture of a heat-exchanger tube embodying the invention.

A device is used, which consists of n=3 tool holders 6, into each of which are integrated a rolling tool 7 and at least one structured rolling disk 8 connected thereafter (FIG. 3 illustrates only one tool holder 6. However, it is possible to use, for example, four or more tool holders 6). The tool holders 6 are arranged each offset at a α=360°/n on the periphery of the finned tube. The tool holders 6 can be fed radially. They are themselves arranged in a stationary (not illustrated) rolling head (the fin is according to another modification moved merely axially forwardly with the rolling head rotating).

The smooth-surfaced tube 1', which is fed in the direction of the arrow, is rotated by the driven rolling tools 7 arranged on the periphery, with the axes of the rolling tools 7 extending inclined with respect to the axis of the tube. The rolling tools 7 consist in a conventional manner of several side-by-side arranged rolling disks 9, the diameter of which increases in the direction of the arrow. The centrically arranged rolling tools 7 form the helically extending ribs 2 out of the wall of the tube of the smooth-surfaced tube 1', with the smooth-surfaced tube 1' being here supported by a profiled rolling mandrel 10. The helically extending fins 11 on the inside of the tube 1 identified by the reference numeral 11 are created at the same time.

Figure 4:
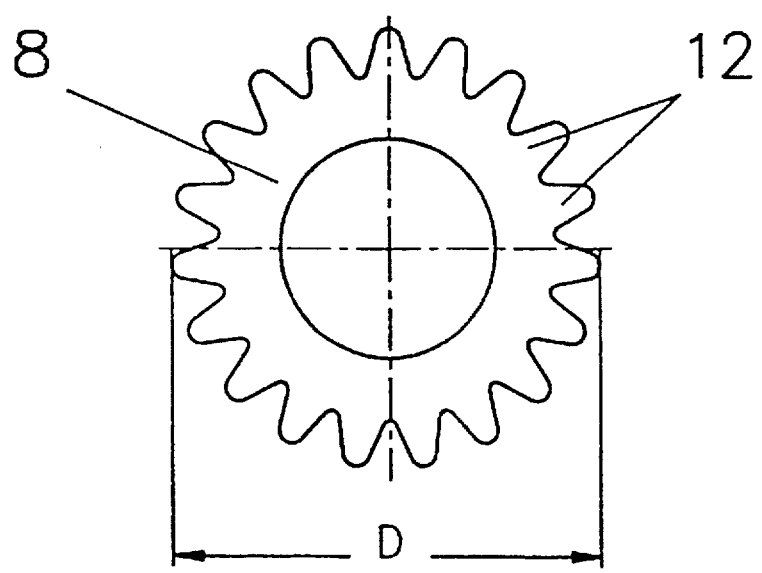
FIG. 4 illustrates a structured rolling disk for use in a device according to FIG. 3.
Figure 5:
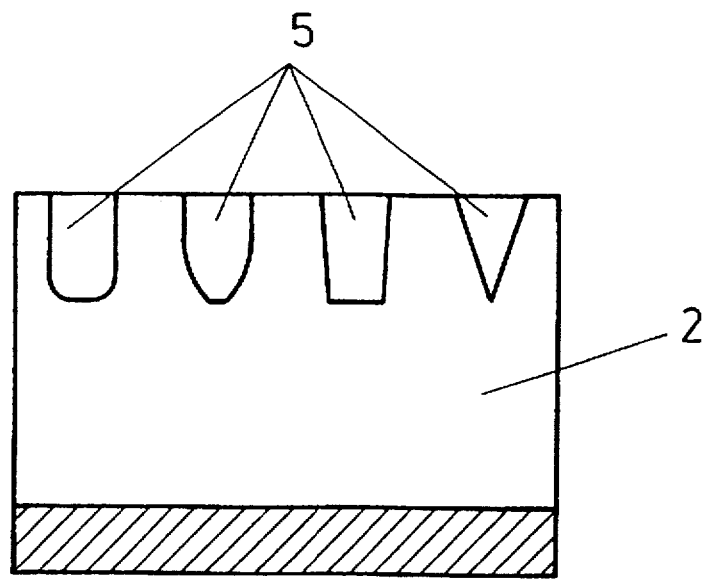
FIG. 5 illustrates various longitudinal cross-sectional forms of the depressions of the invention.
Figures 6A, 6B, 6C, 6D, 6E:
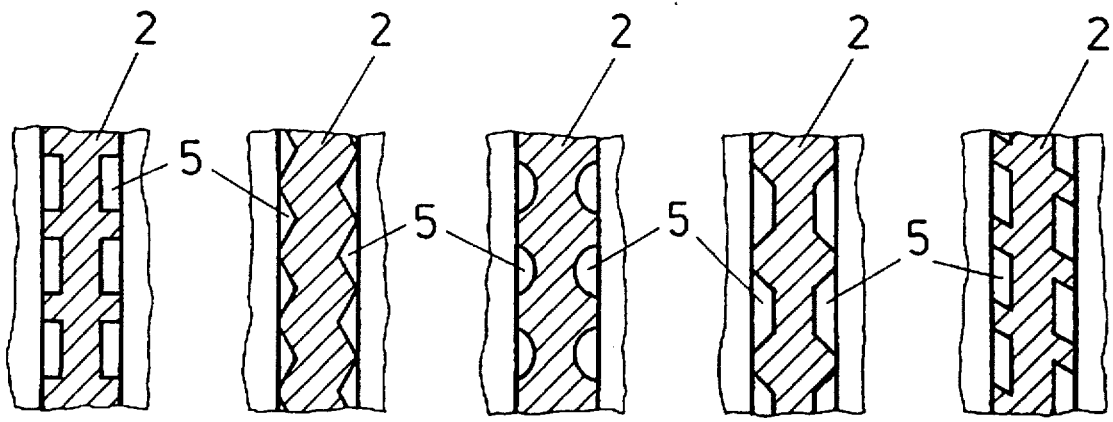
FIGS. 6a–6e illustrate various cross-sectional forms of the depressions of the invention.

The depressions 5 are created by the structured rolling disk 8 of the diameter D engaging with each of the teeth 12 the rib flanks 4 (compare FIG. 4). By rolling in the depressions 5 a cantilevering of the material (not shown) at the base of the depressions 5 can occur.

FIGS. 5 and 6a–6e illustrate possible longitudinal or cross-sectional forms of the depressions 5 (according to the cross-sectional planes A—A or rather B—B in FIG. 2).

Figures 7A, 7B, 7C:
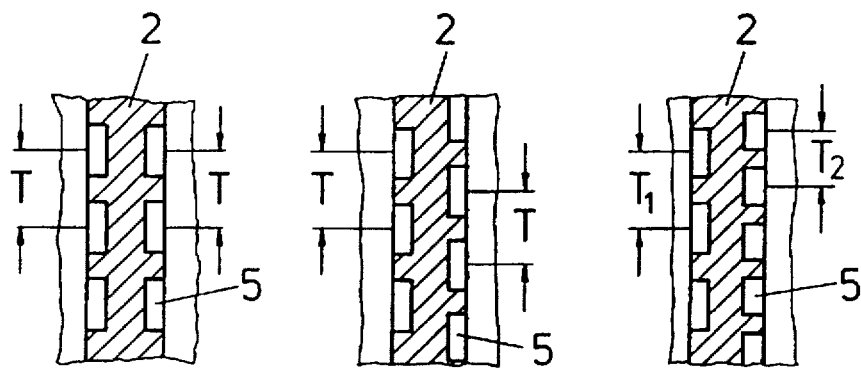
FIGS. 7a–7c illustrate various arrangements of the depressions of the invention on the flanks of the fins.

FIG. 7a illustrates the aligned arrangement of depressions 5. FIG. 7b the offset arrangement of depressions 5 (each at the same pitch T on both rib flanks 4). FIG. 7c illustrates the arrangement of depressions 5 at different pitches $T_1$ or rather $T_2$.

Figure 8:
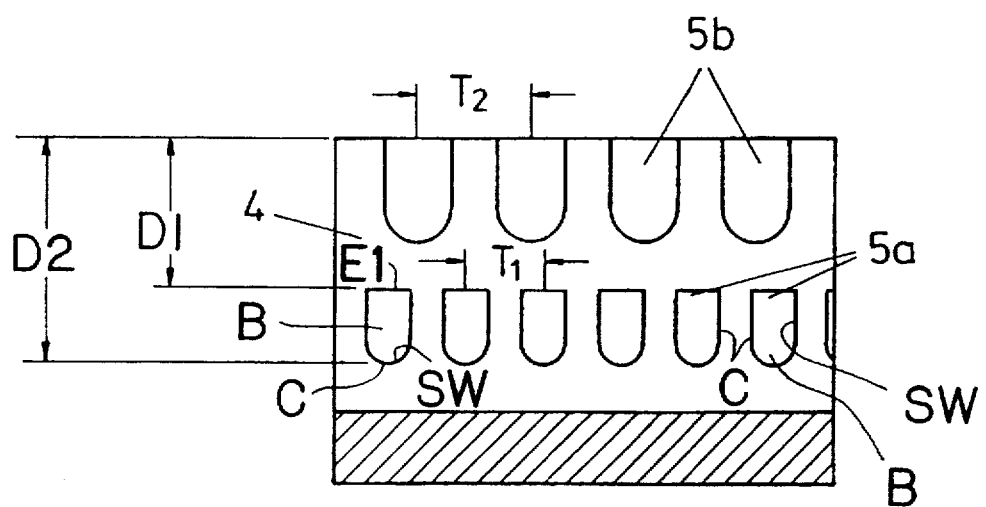
FIG. 8 illustrates two rows of depressions of the invention at various heights of the fin flanks.

FIG. 8 illustrates finally two rows of depressions 5a or rather 5b (of a different pitch $T_1$ or rather $T_2$) at a different height on the rib flanks 4. Two structured rolling disks 8 would be needed for this purpose in the rolling tool 7 according to FIG. 3, with the lower row of the depressions 5a being produced by a first rolling disk 8 with a relatively large diameter and a relatively small thickness, and the upper row of the depressions 5b being produced by a second rolling disk with a smaller diameter and greater width.

In other words, a metallic heat-exchanger tube 1 is created having integral external fins 2 which extend either in a generally axial direction or annularly or helically on an outside of the tube. The fins 2 have a uniform fin height H throughout and a trapezoidally-shaped cross section over a majority of the fin height. The fins have generally circumferentially facing or axially facing fin flanks with convex edge defining means thereon. The convex edge defining means include spaced-apart depressions 5 in the fin flanks 4, each of the depressions 5 being elongated in a radial direction to a specified dimension from a fin tip and increasing in depth in a radially inward direction over the entire aforesaid specified dimension (as shown in FIG. 3). The depressions 5 each have a bottom wall B contained in a plane parallel to a central plane P of the fin and terminating at a radially outer edge E flush with a radially outwardly facing surface S at the fin tip so as to define a first convex edge E at a juncture therebetween. Sidewalls SW are interposed between the bottom wall B and the fin flank 4. A juncture between the sidewalls SW and the fin flank 4 as well as between the sidewalls SW and the radially outwardly facing surface S at the fin tip form a second convex edge C therebetween. As shown in FIG. 8, the depressions 5a in the lower row of depressions are each elongated in a radial direction from a first specified dimension D1 from a fin tip to a second specified dimension D2 from the fin tip and increasing in depth in a radially inward direction between the aforesaid first and second specified dimensions and having a bottom wall B contained in a plane parallel to a central plane of the fin and terminating at a radially outer edge flush with the fin flank so as to define a first convex edge E1 at a juncture therebetween, all as has been described above. Further, sidewalls SW are interposed between the bottom wall B and the fin flank 4. A juncture between the sidewalls and the fin flank form a second convex edge C therebetween.

Numerical Example

According to the described rolling method (internally smooth-surfaced) finned tubes 1 of the invention were manufactured with 40 fins per inch (fin pitch t=0.64 mm) and a fin height of H=1 mm at a medium fin thickness of 0.25 mm. Structured rolling disks 8 produced depressions 5 with approximately a half-ovalshaped form approximately 0.06 mm far into the fin flanks 4 at a pitch of T=0.6 mm.

An experimental verification of the measurement showed during the condensation of cooling medium R-22 at $T_c$=45° C. an increase of the transmitted performance of approximately 30% compared to a nonstructured fin tube with the same dimensions.

The inventive use of the structured fin flanks extends in particular to the liquefaction of refrigerant vapors (pure substances and mixtures) on the outside of the tube.

In place of the up to now often used safety refrigerants, it is also possible to use ammonia. Since ammonia has a high surface tension, the inventive fin tubes with structured fin flanks are particularly suited for this. Fin tubes with structured flanks can in an analogous manner also be used for the condensation of water steam. They are also suited for the hydrocarbon vapors or hydrocarbon mixtures, as they occur in the processing technology.

The embodiments of the invention in which an exclusive property or privilege is claimed are defined as follows:

1. In a metallic heat-exchanger tube with fins which extend on an outside of the tube, wherein the fins have fin flanks with convex edge defining means thereon, wherein the fins have a uniform fin height H throughout, wherein the convex edge defining means include spaced apart depressions, and wherein at least two rows of the depressions extend at different heights on the fin flanks.

2. The heat-exchanger tube according to claim 1, wherein the fins are integral with the tube and extend annularly or helically on the outside of the tube.

3. The heat-exchanger tube according to claim 1, wherein the fins are integral with the tube and extend in a generally axial direction on the outside of the tube.

4. The heat-exchanger tube according to claim 1, wherein the fins are of a trapezoidally-shaped cross section.

5. In a metallic heat-exchanger tube with integral external fins which extend annularly or helically on an outside of the tube, wherein the fins have a uniform fin height H throughout and a trapezoidally-shaped cross section over a majority of the fin height, wherein the fins have generally axially facing fin flanks with convex edge defining means thereon, and wherein the convex edge defining means include spaced-apart depressions in the fin flanks, each of the depressions being elongated in a radial direction to a specified dimension from a fin tip and increasing in depth in a radially inward direction toward said specified dimension and having a bottom wall contained in a plane parallel to a central plane of the fin and terminating at a radially outer edge flush with a radially outwardly facing surface at the fin tip so as to define a first convex edge at a juncture therebetween, and sidewalls interposed between the bottom wall and the fin flank, a juncture between the sidewalls and the fin flank as well as between the sidewalls and the radially outwardly facing surface at the fin tip forming a second convex edge therebetween.

6. In a metallic heat-exchanger tube with integral external fins which extend annularly or helically on an outside of the tube, wherein the fins have a uniform fin height H throughout and a trapezoidally-shaped cross section over a majority of the fin height, wherein the fins have generally axially facing fin flanks with convex edge defining means thereon, and wherein the convex edge defining means include spaced-apart depressions in the fin flanks, each of the depressions being elongated in a radial direction from a first specified dimension from a fin tip to a second specified dimension from the fin tip and increasing in depth in a radially inward direction between the aforesaid first and second specified dimensions and having a bottom wall contained in a plane parallel to a central plane of the fin and terminating at a radially outer edge flush with the fin flank so as to define a first convex edge at a juncture therebetween, and sidewalls interposed between the bottom wall and the fin flank, a juncture between the sidewalls and the fin flank forming a second convex edge therebetween.

7. In a metallic heat-exchanger tube with integral external fins which extend in a generally axial direction on an outside of the tube, wherein the fins have a uniform fin height H throughout and a trapezoidally-shaped cross section over a majority of the fin height, wherein the fins have generally circumferentially facing fin flanks with convex edge defining means thereon, and wherein the convex edge defining means include spaced-apart depressions in the fin flanks, each of the depressions being elongated in a radial direction to a specified dimension from a fin tip and increasing in depth in a radially inward direction toward said specified dimension and having a bottom wall contained in a plane parallel to a central plane of the fin and terminating at a radially outer edge flush with a radially outwardly facing surface at the fin tip so as to define a first convex edge at a juncture therebetween, and sidewalls interposed between the bottom wall and the fin flank, a juncture between the sidewalls and the fin flank as well as between the sidewalls and the radially outwardly facing surface at the fin tip forming a second convex edge therebetween.

8. In a metallic heat-exchanger tube with integral external fins which extend in a generally axial direction on an outside of the tube, wherein the fins have a uniform fin height H throughout and a trapezoidally-shaped cross section over a majority of the fin height, wherein the fins have generally circumferentially facing fin flanks with convex edge defining means thereon, and wherein the convex edge defining means include spaced-apart depressions in the fin flanks, each of the depressions being elongated in a radial direction from a first specified dimension from a fin tip to a second specified dimension from the fin tip and increasing in depth in a radially inward direction between the aforesaid first and second specified dimensions and having a bottom wall contained in a plane parallel to a central plane of the fin and terminating at a radially outer edge flush with the fin flank so as to define a first convex edge at a juncture therebetween, and sidewalls interposed between the bottom wall and the fin flank, a juncture between the sidewalls and the fin flank forming a second convex edge therebetween.

9. The heat-exchanger tube according to claim 5 or 6 or 7 or 8, wherein 4 to 30 depressions per cm of fin length are provided.

10. The heat-exchanger tube according to claim 5 or 6 or 7 or 8, wherein the depressions extend radially to a dimension of 20% to 80% of the fin height H.

11. The heat-exchanger tube according to claim 5 or 6 or 7 or 8, wherein the depressions have one of a rounded, semicircular, half-ovalshaped, rectangular, trapezoidal and triangular longitudinal cross section when viewed parallel to a radius of the fin.

12. The heat-exchanger tube according to claim 5 or 6 or 7 or 8, wherein the depressions have one of a rectangular, triangular, rounded, trapezoidal and rhombic cross section when viewed perpendicularly with respect to the fin flank.

13. The heat-exchanger tube according to claim 5 or 6 or 7 or 8, wherein at least two rows of depressions extend at a different height on the fin flanks.

14. The heat-exchanger tube according to claim 5 or 6 or 7 or 8, wherein the depressions are arranged each in one of alignment with one another and offset with respect to one another in opposite fin flanks on one fin.

15. The heat-exchanger tube according to claim 5 or 6 or 7 or 8, wherein the depressions in opposite fin flanks of one fin have each a different longitudinal or cross-sectional form and/or are arranged with a different pitch T.

16. The heat-exchanger tube according to claim 5 or 6, wherein the tube has 10 to 80 fins per inch with a fin height H in the range of 0.5 to 1.77 mm.

17. The heat-exchanger tube according to claim 5 or 6 or 7 or 8, wherein the fin tips are upset.

18. The heat-exchanger tube according to claim 5 or 6 or 7 or 8, wherein the inside of the tube is structured.

19. The heat-exchanger tube according to claim 18, wherein the structured inside of the tube is defined by helically extending inner trapezoidal fins.

20. The heat-exchanger tube according to claim 18, wherein the structured inside of the tube is defined by corrugations which extend at one of the same angle and a different helix angle as a helix formed by a base of the outer fins.

21. The heat-exchanger tube according to claim 20, wherein the corrugations arranged on the inside of the tube are interrupted.

* * * * *